United States Patent [19]

Dainius et al.

[11] 4,154,866

[45] May 15, 1979

[54] METHOD OF PRODUCING FROM WOOD TAR A LIQUID SMOKE PRODUCT FOR USE IN FOOD PROCESSING, AND PRODUCT OF SAID METHOD

[75] Inventors: Balys Dainius, Schaumburg; Charles Dame, Naperville, both of Ill.; James O'Hara, Marietta, Ga.

[73] Assignee: Stange Co., Chicago, Ill.

[21] Appl. No.: 717,369

[22] Filed: Aug. 24, 1976

[51] Int. Cl.² ............................................. A23L 1/232
[52] U.S. Cl. ................................. 426/650; 426/429; 426/492
[58] Field of Search ............... 426/314, 315, 533, 386, 426/387, 650, 652, 429, 492, 493, 494; 201/29; 203/40, 41, 47, 64, 91; 208/2

[56] References Cited

U.S. PATENT DOCUMENTS

| | | | |
|---|---|---|---|
| 1,753,358 | 4/1930 | Wright | 203/41 |
| 2,095,857 | 10/1937 | Carter et al. | 203/41 |
| 2,400,466 | 5/1946 | Reiter et al. | 203/47 |
| 3,106,473 | 10/1963 | Hollenbeck | 426/650 |
| 3,445,248 | 5/1969 | Miler et al. | 426/533 |
| 3,480,446 | 11/1969 | Hollenbeck | 426/602 |
| 3,663,237 | 5/1972 | Moller | 426/315 |
| 3,806,609 | 4/1974 | Goblik et al. | 426/650 |
| 3,873,741 | 3/1975 | Melcer et al. | 201/29 X |

FOREIGN PATENT DOCUMENTS

2507385  8/1975  Fed. Rep. of Germany ........... 426/652

*Primary Examiner*—Raymond N. Jones
*Assistant Examiner*—Esther M. Kepplinger
*Attorney, Agent, or Firm*—Wegner, Stellman, McCord, Wiles & Wood

[57] ABSTRACT

A liquid smoke product which contains no detectable amount of 3,4-benzopyrene (also known as benzo(a)pyrene) consists essentially of propylene glycol together with those components of the heavy, essentially water insoluble material that settle out of an aqueous condensation of wood smoke (hereinafter called "wood tar") which codistill at or below the boiling point of propylene glycol and most of which are soluble in propylene glycol.

A method of making the above product by mixing about three parts by weight of wood tar with one part by weight propylene glycol to form a feed material, heating said feed material to about 280° F. to 290° F., reducing the pressure to about 100 mm. of mercury to cause codistillation of the desired components with the propylene glycol and thereby form a liquid fraction and a vapor fraction, entirely separating the vapor fraction from the liquid fraction, and condensing the vapor fraction which is then treated with a small percentage of activated carbon to assure that the amount of 3,4-benzopyrene is below 0.5 parts per billion, by weight.

5 Claims, 1 Drawing Figure

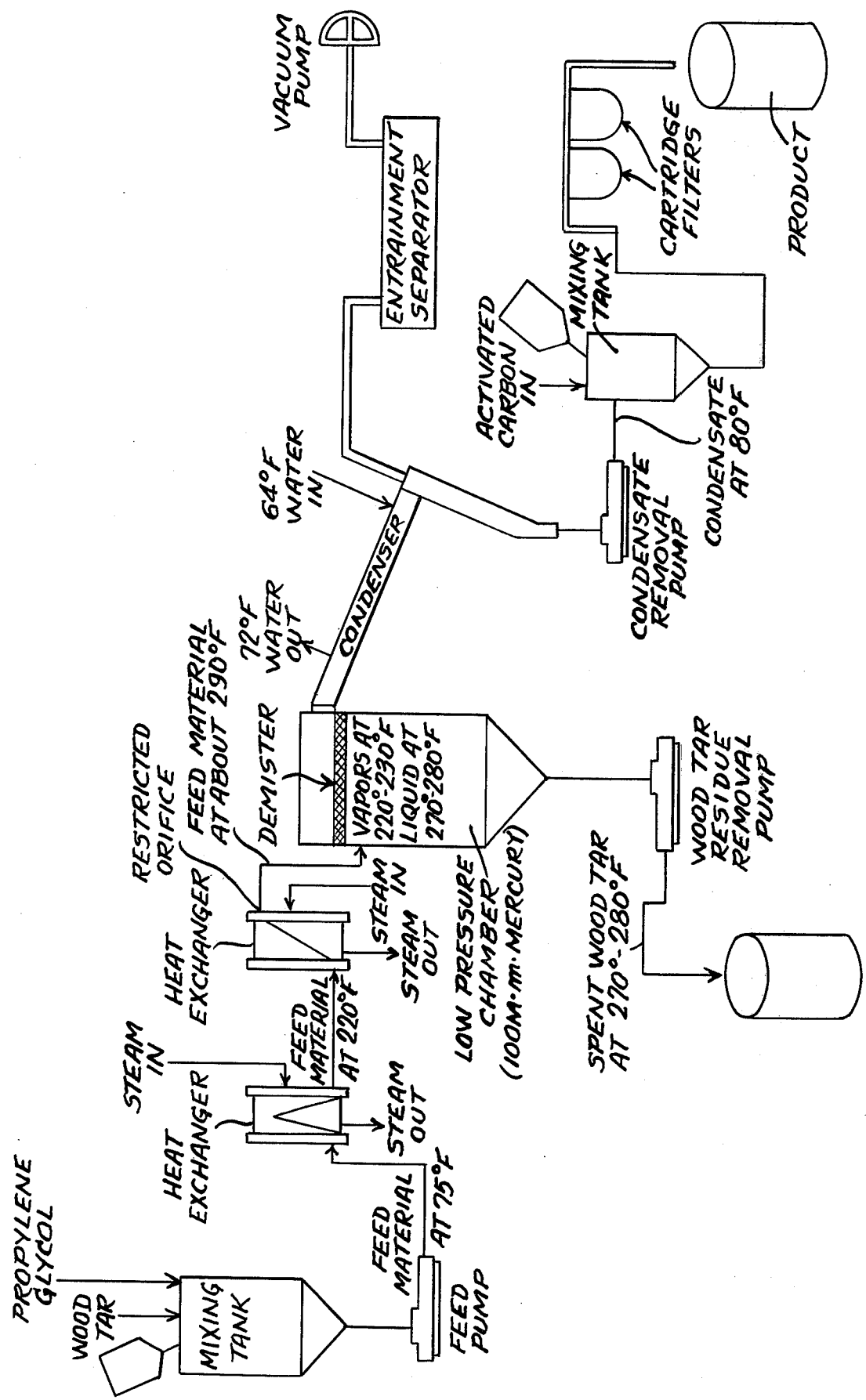

METHOD OF PRODUCING FROM WOOD TAR A LIQUID SMOKE PRODUCT FOR USE IN FOOD PROCESSING, AND PRODUCT OF SAID METHOD

BACKGROUND OF THE INVENTION

Several types of liquid smoke products are known in the food processing industry. One well-known type is an aqueous smoke solution which is produced in accordance with the method of Hollenbeck U.S. Pat. No. 3,106,473. Such an aqueous smoke solution is relatively light in smoke flavor, and is usable only in the processing of foods with which water is compatible. Hollenbeck U.S. Pat. No. 3,480,446 discloses a method of preparing a smoke flavored edible oil. A smoke flavored oil produced by the method of patent 3,480,446 also has a rather light smoke flavor, because its starting material is the aqueous smoke flavored solution of patent 3,106,473.

When wood smoke is extracted in water, or in the presence of water, there is a substantial heavy fraction of essentially water insoluble material. That material is herein referred to as "wood tar", and the term "wood tar" will be used throughout this specification and claims as the name for that material, which is a very complex mixture of organic compounds. It has heretofore been considered to be a waste product, and is one which presents a severe disposal problem.

SUMMARY OF THE INVENTION

In accordance with the present invention, the wood tar is mixed in the proportion of between about three parts by weight and twenty parts by weight of tar to about one part by weight of propylene glycol to form a feed material, the proportions depending upon the consistency of the tar; the feed material is maintained constantly in motion while it is heated to a temperature of about 280° F. to 290° F.; and it is then subjected to a reduced pressure, such as 100 mm. of mercury. This vaporizes the propylene glycol and all of those components of the wood tar which codistill at or below the boiling point of the propylene glycol at the reduced pressure. The vapor fraction is conducted away from the liquid fraction through a demister comprising a material such as stainless steel wool which traps entrained liquid. The vapor fraction is then condensed and intimately contacted with a small percentage of activated carbon to assure that it contains less than 0.5 parts per billion of 3,4-benzo-pyrene.

Practical commercial processing does not permit complete separation of the wood tar from the water and the smoke components dissolved in it, so the raw material for the practice of this invention may contain about 10% water and water soluble smoke components. Accordingly, "wood tar" for purposes of this invention may include a small percentage of aqueous smoke.

The liquid smoke product of the present invention consists, therefore, of propylene glycol, together with those wood tar components which codistill under reduced pressure, such as 100 mm. of mercury, at or below the boiling point of propylene glycol. Most of such components are soluble in propylene glycol. In addition, the product contains a small amount of water and water soluble smoke components.

The product has a very high level of smoke flavor (40 to 50 times stronger than aqueous smoke) so that only a very small quantity of it is required to flavor a rather substantial amount of a food product. After treatment with about 1% by weight of powdered activated carbon the product contains no detectable amount of 3,4-benzopyrene as determined by very sensitive chromatographic analysis. A method of analysis which will disclose the presence of as little as 0.5 parts per billion of 3,4-benzopyrene in the product is described in "Determination of Benzopyrene in Smoke Condensates by High Pressure Liquid-Liquid Chromatography", Journal of Food Science, Vol. 39 (1974). Accordingly, the phrase "no detectable amounts of 3,4-benzopyrene" is used herein to mean that it is not detectable by the above described analysis.

While propylene glycol is the preferred material for use in the method of the present invention, it is apparent that other edible liquids, such as butylene glycol, which have a sufficiently low boiling point and which are solvents for all or most of the components of the wood tar may be used in the practice of the method of the present invention.

Obviously, any edible liquid to be used in the present method must impart no undesirable characteristics to the smoke product, and must be compatible with any food products with which the material may be used.

The word "codistillation" is used herein to define the simultaneous vaporization of those components of a mixture which can be vaporized at or below a selected temperature, even though some of those components may have a boiling point or boiling range which is above the selected temperature.

THE DRAWING

The drawing is a diagram of the apparatus and processing steps used in the method of the invention.

DETAILED DESCRIPTION OF THE INVENTION

As previously indicated, the present method makes a commercially acceptable product out of the wood tar which is a discarded byproduct in the production of certain types of aqueous smoke. The raw material for the practice of the present method may, therefore, be produced by any of several commercially practical methods for producing an aqueous smoke product and wood tar.

The wood tar, usually together with about 10% of aqueous smoke solution, provides the raw material for the practice of the present invention. It is heated to about 140° F. to make it flowable, and is introduced into a mixing tank where it is thoroughly mixed with propylene glycol to form a feed material. When the raw material is processed with propylene glycol, a satisfactory ratio is about three parts by weight of raw material to one part by weight of propylene glycol. This ratio, however, may vary over a rather wide range depending upon the characteristics of the raw material and the method by which it is produced. Based upon the work performed by the inventors, but without having tested the entire range specifically, it is believed that as little as one part by weight of propylene glycol to twenty parts by weight of the raw material can be used to obtain a satisfactory product. The maximum ratio of propylene glycol to raw material is limited principally by economic considerations.

By the time the feed material is ready to be pumped out of the mixing tank its temperature is reduced to about 75° F., and a feed pump moves it into a processing system, at least a portion of which is maintained below atmospheric pressure by a vacuum pump. Although the vacuum pump is capable of maintaining a pressure of about 100 mm. of mercury in the system, the pressure at the feed pump is substantially higher than this because of the relatively small diameter pipe between the feed pump and the two heat exchangers in the system, and a restricted orifice at the exit of the second heat exchanger.

The system includes two plate-type heat exchangers, each of which has an internal structure of heat exchange baffles which produce considerable turbulence in the feed material. The feed material is preheated in the first heat exchanger to a temperature of about 220° F. and is then heated in a second heat exchanger to about 280° F. to 290° F.

From the second heat exchanger the feed material enters a low-pressure chamber. The pressure inside the chamber is about 100 mm. of mercury so that the feed material is rapidly separated into a vapor phase at a temperature of about 220° F. to 230° F., and a liquid phase at a temperature of 270° F. to 280° F. From the low-pressure chamber the vacuum pump draws the vapors through a demister comprising stainless steel wool which removes fine particles of entrained liquid from the vapor. The vapor, of course, includes most of the propylene glycol, the components of the wood tar which codistill at or below the temperature of the vapor at the pressure which prevails in the low pressure chamber, together with water vapor and vaporized water soluble smoke components.

It will be readily apparent to those skilled in the art that the separation process which takes place in the low pressure chamber is a single stage codistillation of propylene glycol (or other solvent) and those components which codistill at or below the vapor temperature in the chamber. This temperature is effectively controlled by the selection of the solvent. Propylene glycol is especially suitable in the present case because its boiling point at or below atmospheric pressure is substantially lower than that of the undesirable 3,4-benzopyrene-containing substances present in the wood tar. Thus, most of these undesirable substances remain in the liquid as the solvent and the desirable, lower boiling-point components vaporize and are removed.

A low pressure chamber is used to prevent thermal decomposition of certain components of the wood tar which occurs at or close to the boiling point of propylene glycol at atmospheric pressure, and also to reduce energy requirements. The pressure in the chamber should be less than about ⅔ atmosphere, and about 100 mm. of mercury is desirable because it can be achieved with a relatively inexpensive, standard water sealed vacuum pump.

From the low-pressure chamber the vapor is drawn into heat exchange tubes of a conventional shell-and-tube condenser which is cooled by water which enters the condenser jacket at about 64° F. and is exhausted from the condenser jacket at about 72° F. The condensed product, at about 80° F., is withdrawn from the discharge end of the condenser by a condensate removal pump.

The final step of the present invention consists of the adsorption of certain undesirable components, including any traces of 3,4-benzopyrene, from the liquid smoke. As schematically illustrated in the drawing, the adsorption is preferably effected by intimately contacting the liquid smoke with a controlled proportion of activated carbon. After the adsorption step there is less than 0.5 parts per billion, by weight of 3,4-benzopyrene in the product.

Activated carbon is commercially available in granular form and in powder form. The latter form is preferred because it does not trap and hold the feed material and thus affords much higher yields than are produced with the granular material.

One example of a commercially available activated carbon is "Type PWA Pulverized Carbon" produced by Pittsburgh Activated Carbon Division of Calgon Corporation, Pittsburgh, Pennsylvania. Type PWA Pulverized Carbon has a particle size of 65–75% minus 325 mesh (U.S. Sieve Series, opening of 44 microns), and a total surface area ($N_2$ B.E.T. Method) of 1000–1100 m$^2$/g. This type of carbon has been prewashed with acid to remove iron-containing contaminants. It is known that iron contaminants present on the carbon can form complexes with certain phenolic components of the liquid smoke, thereby imparting an undesirable dark color to the final product.

The contacting of the activated carbon and the liquid smoke is preferably effected by agitation in conventional mixing equipment. It is necessary that the agitation continue only so long as to allow adsorption of any 3,4-benzopyrene present in the liquid smoke. While the required period of time may vary with the percentage of activated carbon to liquid smoke, it has been found that an agitation time of 15 minutes is sufficient to remove all detectable amounts of 3,4-benzopyrene from liquid smoke when 1% by weight of activated carbon powder is mixed with the liquid smoke. Larger quantities of activated carbon may be used but 1% by weight is sufficient to adsorb all detectable amounts of 3,4-benzopyrene without causing a noticeable change in the flavor strength of the product. As progressively larger amounts of activated carbon are used yields are reduced and somewhere between about 5% and 10% there are detectable diminutions in flavor strength.

The carbon-liquid mixture is then filtered to remove all of the solid constituents from the mixture. Filtering may be done in the conventional manner, as with a vacuum drum filter or through a filter-aid such as diatomaceous earth, for example. Filtering removes trapped particulates which may have been carried through the demister, as well as the activated carbon. The resulting product may then be diluted or otherwise prepared for commercial use.

A residue pump removes the spent wood tar from the bottom of the low pressure chamber at about 270° F. to 280° F., and the tar is deposited in drums or other containers for disposal.

The vacuum pump which reduces the pressure in the system to about 100 mm. of mercury may, under certain conditions, suck minute particles of condensate from the discharge end of the condenser. To prevent any such particles from entering the vacuum pump and being discharged to the atmosphere, the vacuum line may pass through an entrainment separator between the discharge end of the condenser and the vacuum pump. The unlikelihood of such entrainment occurring, and the small quantities of entrained material involved if it does occur, make the use of an entrainment separator at this point of marginal value, even for the purpose of avoiding air pollution. The entrainment separator has no value in the economics of the system.

As previously indicated, although propylene glycol is the preferred solvent, other edible liquids such as butylene glycol may be used in the practice of the method of the present invention. The use of a solvent whose boiling point differs from that of propylene glycol may slightly alter the flavor and aroma characteristics of the final product because the codistillation temperature depends upon the solvent, and alteration of this temperature results in the addition or deletion of certain wood tar components in the vapor fraction.

A specific example will provide an illustration of the practice of our invention.

A feed mixture was prepared by mixing one part by weight of propylene glycol with three parts by weight of the water insoluble wood tar recovered from the product of absorption of wood smoke by water, as described above. The wood tar-propylene glycol mixture was pumped at approximately 600 lbs./hour through a first heat exchanger wherein the mixture was preheated to approximately 220° F. The preheated feed then entered another heat exchanger where it was further heated to about 290° F. so as to vaporize a substantial portion of the mixture.

The liquid-vapor mixture passed from the second heat exchanger to a liquid-vapor separator of the conventional type, which was maintained under a vacuum, with the total pressure being approximately 100 mm. of mercury. The non-vaporized liquids, at a temperature of about 270° F.–280° F., were removed from the separator for disposal at a rate of about 400 lbs./hour. The vapors, at a temperature of about 220° F.–230° F., passed from the separator at a rate of about 200 lb./hour through a "packed" exit or "demister" of the conventional type, wherein entrained non-vaporized tar constituents were removed.

The vapors passing from the demister entered a conventional shell-and-tube condenser wherein they were condensed by heat exchange with cool (65° F.) water and cooled to approximately 80° F.

The condensate was mixed with 1% by weight of Type PWA Pulverized Carbon and agitated for 15 minutes. The mixture was then filtered through a large Buchner-type filter which was pre-coated with a filter aid comprising diatomaceous silica and marketed under the trade name "Celatom FW-14" by Eagle Picher Products. The filter aid was pre-washed with acid to remove iron contaminants to prevent undesirable coloration of the final product, as discussed above in connection with the activated carbon.

The filtrate contained less than 0.5 parts per billion, by weight, of 3,4-benzopyrene, and no change in flavor or aroma chacteristics could be detected. The filtrate was then mixed with propylene glycol to standardize the final product to about 18% smoke constituents before final packaging and shipment. Such dilution may alternatively take place before the carbon mixing.

The foregoing detailed description is given for clearness of understanding only and no unnecessary limitations should be understood therefrom, as modifications will be obvious to those skilled in the art.

We claim:

1. A method of treating wood tar to make a liquid smoke product which contains no detectable amount of 3,4-benzopyrene, said method comprising:
   (a) forming a feed material by mixing from a maximum of about twenty parts by weight to about three parts by weight of wood tar with one part by weight of propylene glycol;
   (b) heating said feed material to about 220° F. followed by heating said feed material to about 280° F., said feed material being agitated while being heated;
   (c) subjecting said feed material to a pressure less than about ⅜ atmosphere whereby said feed material is separated into a vapor fraction consisting of said propylene glycol and the components of said wood tar which codistill at or below the boiling point of the propylene glycol, and a liquid fraction;
   (d) separating the vapor fraction from the liquid fraction;
   (e) condensing said vapor fraction;
   (f) intimately contacting said condensed vapor fraction with pulverized activated carbon to assure that no detectable amount of 3,4-benzopyrene is present in said vapor fraction; and
   (g) filtering said activated carbon powder from said condensed vapor fraction.

2. The method of claim 1 in which the pulverized activated carbon has a particle size of 65–75% minus 325 mesh (U.S. Sieve Series, opening of 44 microns), and a total surface area ($N_2$B.E.T. Method) of 1000–1100 m$^2$/g.

3. The method of claim 1 in which the pulverized activated carbon has been pre-washed with acid to eliminate iron contaminants capable of reacting with components of the liquid smoke.

4. The method of claim 1 wherein said adsorbent is removed from said condensed vapor fraction by filtration.

5. The liquid smoke product produced according to the method of claim 1.

* * * * *